Aug 5, 1941.   F. BROWN   2,251,437
ABRASIVE ARTICLE AND METHOD OF MANUFACTURING THE SAME
Filed Nov. 15, 1937

INVENTOR.
FRED BROWN
BY R. C. Benner,
ATTORNEY.

Patented Aug. 5, 1941

2,251,437

UNITED STATES PATENT OFFICE 2,251,437

ABRASIVE ARTICLE AND METHOD OF MANUFACTURING THE SAME

Fred Brown, Niagara Falls, Ontario, Canada, assignor to The Carborundum Company, Niagara Falls, N. Y., a corporation of Delaware Application November 15, 1937, Serial No. 174,608

7 Claims. (Cl. 51—293)

This invention relates to improved abrasive articles and methods of manufacturing the same. More specifically, the invention is directed to multi-layered abrasive articles containing a resinous bond.

In the manufacture of multi-layered abrasive articles with resinous bonds, it has heretofore been customary to prepare a mixture of abrasive grains with the bond and mold an article from the mixture. The most commonly used method for making such mixtures consists in wetting abrasive grains with a resin solvent and mixing the wetted grains with a pulverized resin, the proportions of grain, solvent and powdered resin being such as to give a dry distributable mix wherein the solvent is dried up by the powdered resin and yet the proportion of resin is such that the powder is all attached to the grains.

While this method of making such abrasive articles as abrasive wheels has been of very great utility in the manufacture of wheels of many sizes, it has been found to be very difficult to properly compress a mixture where the article is of very great thickness. Furthermore, it is also very difficult to mold extremely thin wheels such as are commonly referred to as cut-off wheels, from such mixtures because of the difficulty in preparing a layer of the thinness required which shall be uniform in thickness throughout.

I have discovered a method of making resin bonded abrasive articles which is adapted to the manufacture of multi-layered articles of substantially any size and proportions. My method may therefore be used for making any of the articles heretofore made by the method described above but it is of particular utility in the manufacture of extremely thin or the very thick articles to which the older method is not well adapted.

In addition to the fact that it is possible to make articles of dimensions which have heretofore been impractical with the older methods, my invention has the advantage that it is relatively inexpensive and is well adapted to commercial production. It is also possible by employing certain modifications of the invention to produce abrasive articles having structures which have not been obtainable by the methods heretofore used.

It is accordingly an object of the invention to provide an improved method of manufacturing resin bonded abrasive articles.

Another object of the invention is the provision of resin bonded abrasive articles having a unique structure which is especially well adapted for certain purposes.

In carrying out my invention, I first prepare a sheet or film consisting of abrasive grains and the resinous bond. This web can be most conveniently prepared by coating a surface of a backing material, which is of such character that the resinous bond is poorly adhesive to it at a certain stage of the process, with the resinous bond and with abrasive grains, as for example, by the method commonly used in making sandpaper. In such a method a web of backing material, which may be a starch-sized, coarsely woven cloth, is passed between a pair of rolls, one of which rotates in a vat of the liquefied resin bond. A coating of the bond is thus applied to the starch-sized side of the cloth in predetermined amount and abrasive grains are then deposited on this film of resin. In order to increase the amount of bond, the abrasive grains may be preliminarily coated with solid bond if desired, though this is not an essential step of the process of my invention.

After a preliminary drying, additional resin may be applied to the web if desired, by running the abrasive coated side of the web in contact with a roll in the manner just described for applying the resin to the web. Alternatively additional bond may be applied by spraying or brushing or other well-known methods.

The resin which I have found to be generally most satisfactory for carrying out my invention consists principally of a phenol aldehyde condensation product which is preferably in the so-called liquid "A" stage, to which there is added a film strengthening material for reasons which will be hereinafter brought out. The phenol aldehyde condensation product should preferably be one which is miscible with water and the film-strengthening material is preferably a water-soluble product which can be dissolved in water and thus mixed into the liquid phenolic resin. One film-strengthening material which I have found to be very satisfactory is polymerized vinyl alcohol. This material is obtainable in a considerable variety of compositions depending upon the number of monomeric molecules in the polymer and to some extent upon the degree of hydrolysis of the ester from which the polymerized alcohol is prepared. As the number of molecules in the polymer is increased the polymerized product becomes tougher and less brittle. I have found it advisable to employ a product having a rather high degree of polymerization since the purpose of including the polymerized vinyl alcohol is to strengthen the film of grain and resin prior to the hardening of the phenolic resin.

Having prepared a web of backing material coated with abrasive grains and the resinous bond including the film-strengthening material, I dry out the product to remove at least a part of the water. At a certain stage in the drying the coating of grain and bond assumes a character such that it can be stripped from the cloth backing. This separation of the grain and backing is usually facilitated by warming the backing somewhat as this appears to slightly soften the bond and decrease the adhesion of the bond to the backing.

When this stage is reached I separate the film of grain and bond from the backing and thus obtain a sheet consisting only of the abrasive grains, which are in a thin and for that matter a substantially single layer, and the resinous bond. This sheet is then employed to build up multi-layered articles of various shapes and sizes.

To facilitate understanding of the invention, I have illustrated it by a number of drawings wherein.

Figure 1:
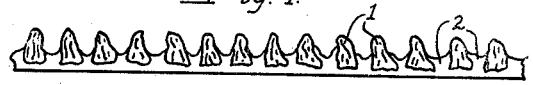
Figure 1 represents a piece of a sheet of the grain and bond which has been prepared as described above.

Referring to the drawing, the article of Figure 1 consists of a thin layer of abrasive grain 1 bonded with the resinous bond 2.

Figure 2:
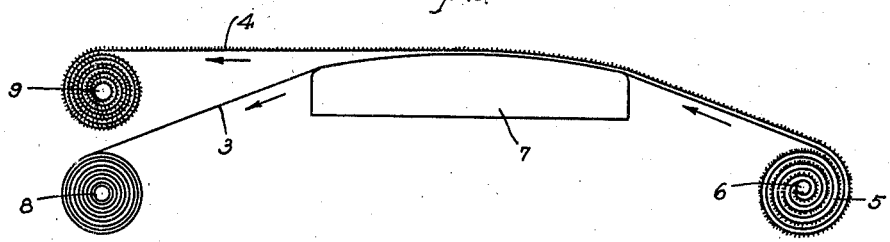
Figure 2 illustrates a method and apparatus for separating the sheet of grain and bond from the supporting backing.

Figure 2 depicts a method and apparatus for separating the article of Figure 1 from the supporting backing. A web of supporting material 3 coated with the article 4 of Figure 1 is wound into a roll 5 supported about its axis 6. The web 5 is pulled over a heated form 7 and the supporting material 3 is wound onto an arbor 8 while the web of sheeted grain and bond is rolled up about an arbor 9.

Figure 3:
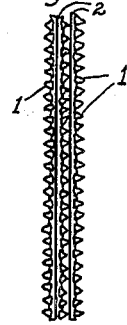
Figure 3 is a side elevation of a thin disc made in accordance with the invention.

The thin cut-off wheel of Figure 3 consists of three sheets of the web material 4, the outer sheets being so positioned that the grains project from the plane surfaces of the disc.

Figure 4:
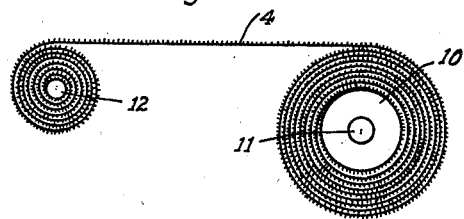
Figure 4 illustrates a method of preparing a thick-multi-layered wheel in accordance with the invention.

In Figure 4 there is shown a method of making a multi-layered wheel of relatively great thickness by winding the web 4 about a supporting core 10, mounted on an arbor 11. Web 4 is transferred from a roll of the web material which is mounted on an arbor 12. After the wheel has been built up to the required thickness it may be heated to first cause a plasticizing and consequent welding together of the bond of the various layers and to subsequently cure the bond.

Figure 5:
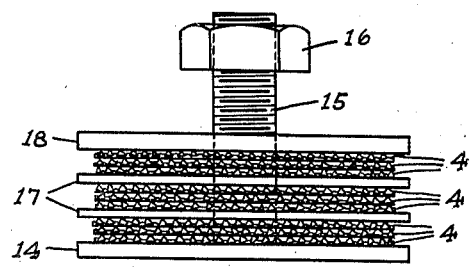
Figure 5 depicts a method and apparatus for forming thin wheels such as are shown in Figure 3.

In Figure 5 there is shown an assemblage of sheets ready to be cured to form the thin wheels of Figure 3. The assemblage comprises a bottom plate 14 attached to a threaded rod 15 which is provided with a nut 16. Layers of the sheet material are placed about the threaded rod 15 and on the bottom plate 14, a separator 17 being interposed between the sheets to form the separate wheels. A top plate 18 is finally placed over the threaded rod and the nut 16 is screwed down onto the top plate 18 to provide a slight pressure on the assemblage. The assemblage may then be placed in a suitable oven and heat treated to first plasticize the bond and then heat-harden it in accordance with well-known practice used in treating phenolic resins, whereupon the wheels may be removed from the spindle. It is usually desirable to coat the plates and separators with a parting material such as a layer of mica dust to prevent sticking of the wheels to the plates. It is also sometimes desirable to moisten a surface of the various sheets with a solvent for the bond in order to assist the plasticization and consequent fusion and welding-together of the bond of the various layers.

The proportion of film-strengthening material which is mixed with the resin bond may be varied within rather wide limits depending upon the character of the bond which it is desired shall be obtained in the completed article. It is usually desirable that the articles should have the properties characteristic of phenolic resin bonds since such bonds are best adapted for most purposes. Consequently, I usually employ the least possible amount of film-forming material in order not to materially modify the properties of the phenolic resin. The minimum amount of the film-strengthening material which can be used is determined by the strength required in the sheet of grain and bond in order to separate the sheet from the backing and to handle it in the subsequent operations. I have used as little as 5% of a highly polymerized polyvinyl alcohol with 95% of liquid "Bakelite," the polyvinyl alcohol being mixed with the liquid "Bakelite" in the form of a 20% solution in water. Greater proportions of the film-strengthening material may be employed and for many purposes it is desirable to employ 10% of the solid polyvinyl alcohol. I have also made articles containing 20% polyvinyl alcohol to 80% liquid phenolic resin. Even greater proportions of the film-strengthening materials may be used when it is desired to obtain articles having the characteristics of a polyvinyl alcohol bond somewhat modified by the phenolic resin.

After the web has been prepared, a number of layers of the web may be assembled in different ways to prepare the finished articles. Where a thin cut-off wheel is being made it is convenient to die out discs from the web of the diameter required in the finished article and preferably to simultaneously die out an arbor hole concentric with the disc. A number of these discs may then be assembled to obtain the article of the required thickness. The assembly of discs may be treated as hereinabove described with reference to Fig. 5 or it may be otherwise treated to first flux together the layers of bond in the sheets as by putting the assembly between the platens of a steam heated press and applying about 2000 lbs. to the square inch to the assembly. After remaining in such a hot press for about 20 minutes the article may be removed from the press and further heated in an oven to complete the transformation of the phenolic resin to the final infusible "C" stage. I have found that articles made by such a method are relatively quite flexible as compared to the usual cold-molded abrasive article or as compared to articles made by the method described in connection with Figure 5. I have also found that the degree of flexibility can be controlled to some extent by varying the length of time that the article is hot pressed.

Where extremely thin cut-off wheels are to be made, I have found it convenient at times to prepare the sheet of grain and bond on a backing which is poorly adhesive to the cured bond, place two such sheets face to face and heat to first plasticize and cause welding together of the two sheets and then cure the bond and finally to remove the backing from the two outer faces of the cured article. For example, sheets of Cellophane are easily removed from cured phenolic resins and I have successfully employed them in this modification of my invention. In such cases it is unnecessary to employ any film-strengthening material since the backing is not removed until the resin bond has been cured.

As has been pointed out above, my invention has a number of advantages over the methods of the prior art. For example, it is possible to produce by my method, cut-off wheels that it has been heretofore impossible to make, particularly in the coarser grits, since the sheets of grain and bond are much thinner than can be struck off in a mold and it is possible to make satisfactory wheels from as few as two of these sheets. Furthermore, the apparatus required is relatively inexpensive and it is not necessary to use molds, which are costly and of relatively short life because of the abrading action of the mixes.

It is also possible, by making up webs of several feet in width, to make wheels of thicknesses which are impractical to produce by the ordinary pressing method.

In describing the invention I have made particular reference to liquid phenol-aldehyde resins as the bond and polyvinyl alcohol as the film-strengthening material since I have found these products to be particularly suited for carrying out my invention. However, I may employ other resins as the bond and other film-strengthening materials as I have found that my new process is well adapted to the employment of a variety of these products. For example, I may use alkyd resins as well as phenolic resins as the principal bond and these resins may be employed in the form of solutions of normally solid resins as well as the liquid resins to which I have made reference. As film-strengthening materials I may employ, besides the polyvinyl alcohol to which I have made specific reference, such materials as vinyl or cellulose esters and ether, synthetic rubber-like materials, and other similar products which form tough and relatively elastic films.

I may likewise employ various modifying agents to alter the properties of either the bond of the completed article or the character and properties of the sheet material which I assemble to form the completed articles of my invention. For example, the bond may be modified by including inert fillers and the properties of the sheet material may be modified by including suitable plasticizing or flexibilizing agents in the original liquid adhesive.

Therefore while the invention has been described with reference to a number of particular embodiments, it is to be understood that it is not limited to the specific steps or materials herein described since other modifications common in the art may be adopted and the scope of the invention is accordingly not to be limited to the particular compositions and embodiments herein described but rather is to be construed as defined by the appended claims.

I claim:

1. In the manufacture of abrasive articles the steps which comprise coating a backing with abrasive grains and a liquid binder comprising a phenolic condensation product which is plasticizable when solidified and a film-strengthening material which is adapted to toughen the phenolic resin film when the liquid binder has been solidified, treating the thus formed article to solidify the binder and form a sheet of grain and solidified binder which can be removed from the backing, separating the sheet from the backing, assembling a plurality of layers of the sheet, and plasticizing the binder to cause the layers of the sheet to become united and thereby form a multi-layered abrasive article.

2. In the manufacture of abrasive articles the steps which comprise coating a backing with a thin layer of abrasive grains and a liquid binder which is plasticizable when solidified and which includes a heat-hardenable phenolic resin and a film-strengthening material, solidifying the liquid binder, separating the layer of binder and grain from the backing to obtain a self-supporting sheet of grain and binder, assembling a plurality of such sheets, plasticizing the binder, subjecting the assemblage to pressure while the binder is plastic to form a unitary multilayered article, and heating the article to harden the resin.

3. In the manufacture of abrasive articles the steps which comprise coating a backing with a thin layer of abrasive grains and a liquid binder which is plasticizable when solidified and which includes a heat-hardenable phenolic resin and a polymerized vinyl compound, solidifying the liquid binder, separating the layer of binder and grain from the backing to obtain a self-supporting sheet of grain and binder, assembling a plurality of such sheets, plasticizing the binder, subjecting the assemblage to pressure while the binder is plastic to form a unitary multilayered article, and heating the article to harden the resin.

4. In the manufacture of abrasive articles the steps which comprise coating a backing with a thin layer of abrasive grains and a liquid binder which is plasticizable when solidified and which includes a heat-hardenable phenolic resin and polyvinyl alcohol, solidifying the liquid binder, separating the layer of binder and grain from the backing to obtain a self-supporting sheet of grain and binder, assembling a plurality of such sheets, plasticizing the binder, subjecting the assemblage to pressure while the binder is plastic to form a unitary multilayered article, and heating the article to harden the resin.

5. In the manufacture of abrasive articles the steps which comprise coating a backing with a thin layer of abrasive grains and a liquid binder which is plasticizable when solidified and which includes a heat-hardenable phenolic resin and a film strengthening material, solidifying the liquid binder, separating the layer of binder and grain from the backing to obtain a self-supporting sheet of grain and binder, winding a number of layers of the sheet about the periphery of a supporting core to form a multi-layered abrasive annulus of the sheets, and heating the article to weld the layers of the annulus together into a unitary structure.

6. An abrasive article comprising an abrasive portion consisting of a plurality of sheets which individually consist of a substantially single layer of abrasive grains and a resinous bond comprising a heat hardened mixture of a phenolic resin and a film-strengthening material, said sheets being welded together into an abrasive portion which is unitary and multilayered.

7. An abrasive article comprising an abrasive portion consisting of a plurality of sheets which individually consist of a substantially single layer of abrasive grains and a resinous bond comprising a heat hardened mixture of a phenolic resin and polyvinyl alcohol, said sheets being welded together into an abrasive portion which is unitary and multilayered.

FRED BROWN.